United States Patent
Naqvi et al.

(10) Patent No.: US 11,218,315 B2
(45) Date of Patent: Jan. 4, 2022

(54) SYSTEM AND METHOD ESTABLISHING A TRUST MODEL FOR SHARED CONTENT ON THE INTERNET

(71) Applicant: Sensoriant, Inc., Cedar Knolls, NJ (US)

(72) Inventors: Shamim A. Naqvi, Morristown, NJ (US); Robert F. Raucci, New York, NY (US)

(73) Assignee: SAFESHARE, INC., Morristown, NJ (US)

( * ) Notice: Subject to any disclaimer, the term of this patent is extended or adjusted under 35 U.S.C. 154(b) by 216 days.

(21) Appl. No.: 16/256,116

(22) Filed: Jan. 24, 2019

(65) Prior Publication Data
US 2019/0229920 A1 Jul. 25, 2019

Related U.S. Application Data

(60) Provisional application No. 62/621,487, filed on Jan. 24, 2018.

(51) Int. Cl.
H04L 29/00 (2006.01)
H04L 9/32 (2006.01)

(52) U.S. Cl.
CPC ............ H04L 9/3218 (2013.01); H04L 9/321 (2013.01); H04L 9/3231 (2013.01); H04L 2209/38 (2013.01)

(58) Field of Classification Search
CPC ..... H04L 9/3218; H04L 9/321; H04L 9/3231; H04L 2209/38; H04L 63/0861; H04L 9/3239
See application file for complete search history.

(56) References Cited

U.S. PATENT DOCUMENTS

| 6,651,171 | B1 | 11/2003 | England |
| 7,149,660 | B2 | 12/2006 | Kuehn |
| 8,280,838 | B2 | 10/2012 | Ferrucci et al. |
| 10,297,106 | B1 * | 5/2019 | Simons ............... G07F 17/3251 |
| 2001/0055388 | A1 | 12/2001 | Kaliski |
| 2008/0222425 | A1 | 9/2008 | Buss |
| 2009/0177591 | A1 | 7/2009 | Thorpe |

(Continued)

FOREIGN PATENT DOCUMENTS

EP 0807911 A2 11/1997

*Primary Examiner* — Mahfuzur Rahman
(74) *Attorney, Agent, or Firm* — Mayer & Williams, PC; Stuart H. Mayer

(57) ABSTRACT

A method is provided for validating an assertion provided by a web resource. The method includes: sending a first request to the web resource over a communications network; responsive to the first request, receiving a web page from the web resource, the web page including at least one user-selectable representation of a cryptographic credential, the cryptographic credential including at least one assertion that is based on underlying data and at least one proof that allows verification that the assertion accurately reflects the underlying data without revealing the underlying data; receiving a selection of the user-selectable representation that causes a second request for verification of the proof to be sent over the communications network; and responsive to the second request, receiving a response indicating whether or not the representation accurately reflects the underlying data.

14 Claims, 7 Drawing Sheets

(Provisioning Phase)

(56) References Cited

U.S. PATENT DOCUMENTS

| | | |
|---|---|---|
| 2012/0102323 A1 | 4/2012 | Lin |
| 2018/0225661 A1 | 8/2018 | Russinovich |
| 2018/0239897 A1 | 8/2018 | Ventura |
| 2018/0309567 A1 | 10/2018 | Wooden |
| 2019/0036887 A1* | 1/2019 | Miller .................... G06F 21/62 |
| 2019/0102409 A1* | 4/2019 | Shi ........................ H04L 9/3239 |
| 2019/0122443 A1* | 4/2019 | Stocker ................ H04L 67/141 |
| 2019/0228133 A1* | 7/2019 | Ansari .................. H04L 9/3247 |
| 2019/0229891 A1 | 7/2019 | Naqvi |
| 2019/0279206 A1 | 9/2019 | Song |
| 2019/0334719 A1 | 10/2019 | Naqvi |
| 2019/0349426 A1* | 11/2019 | Smith ................... H04L 67/104 |
| 2019/0394047 A1 | 12/2019 | Karame |

* cited by examiner

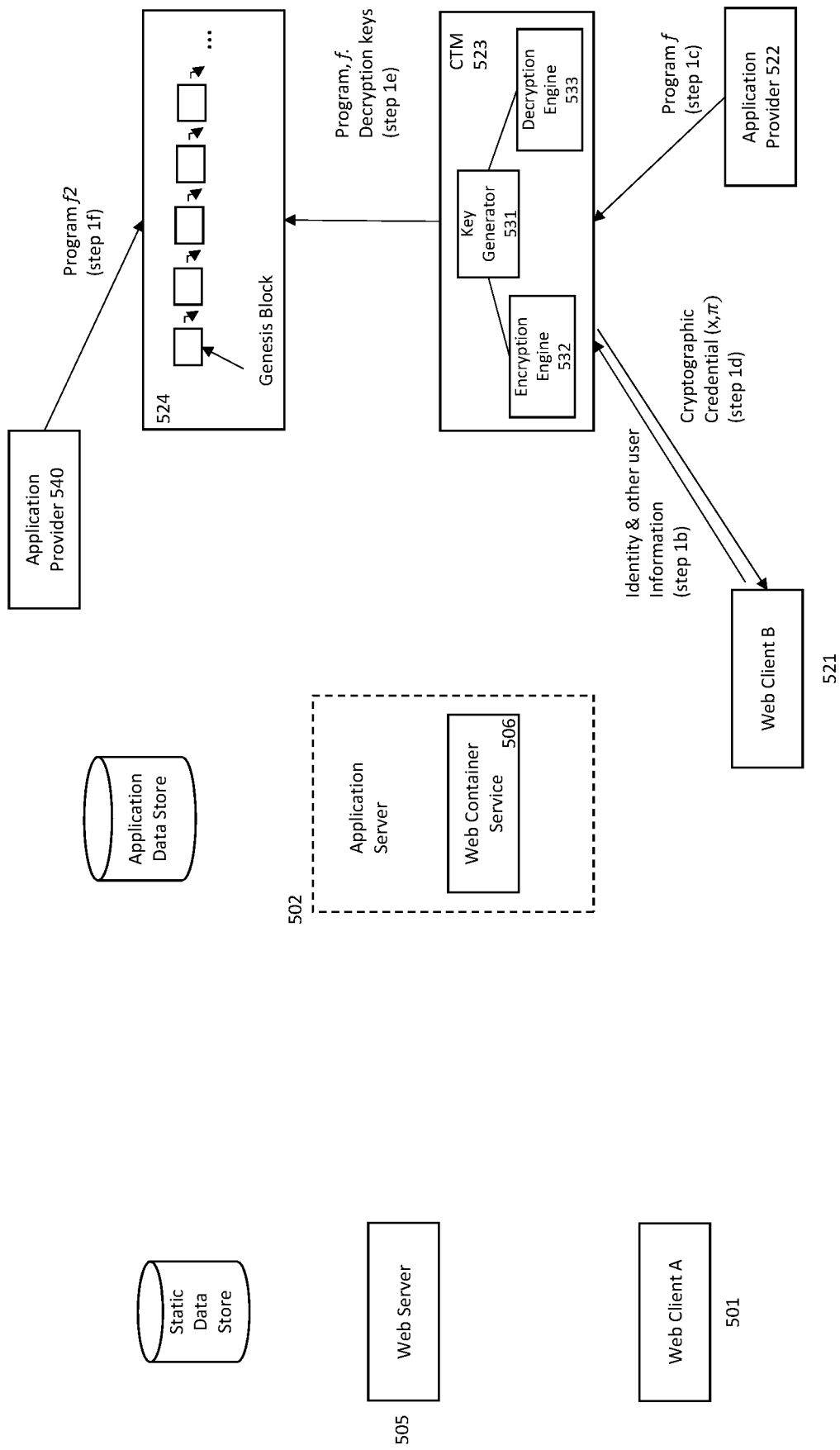
Fig. 5A (Provisioning Phase)

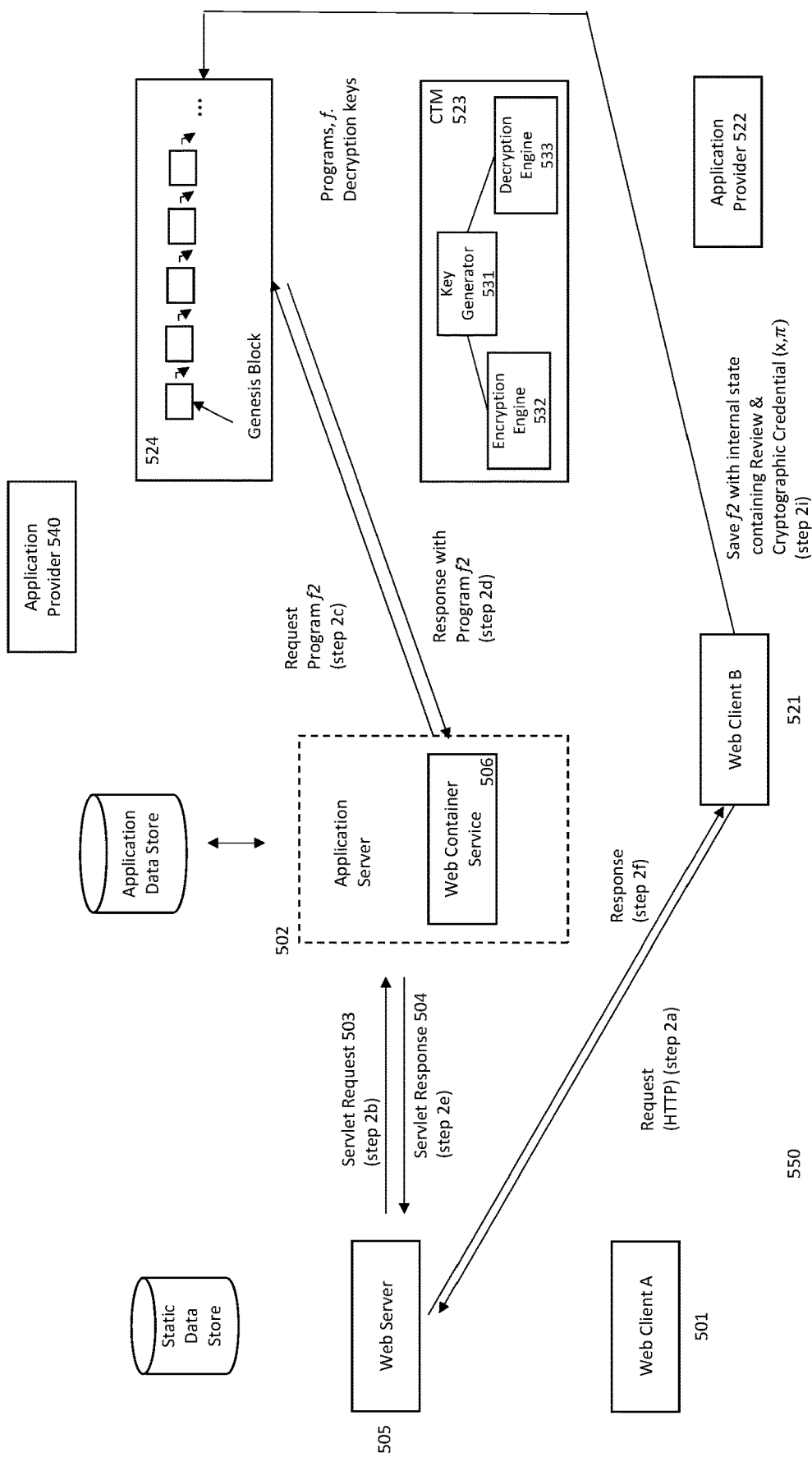
Fig. 5B (Posting Shared Content)

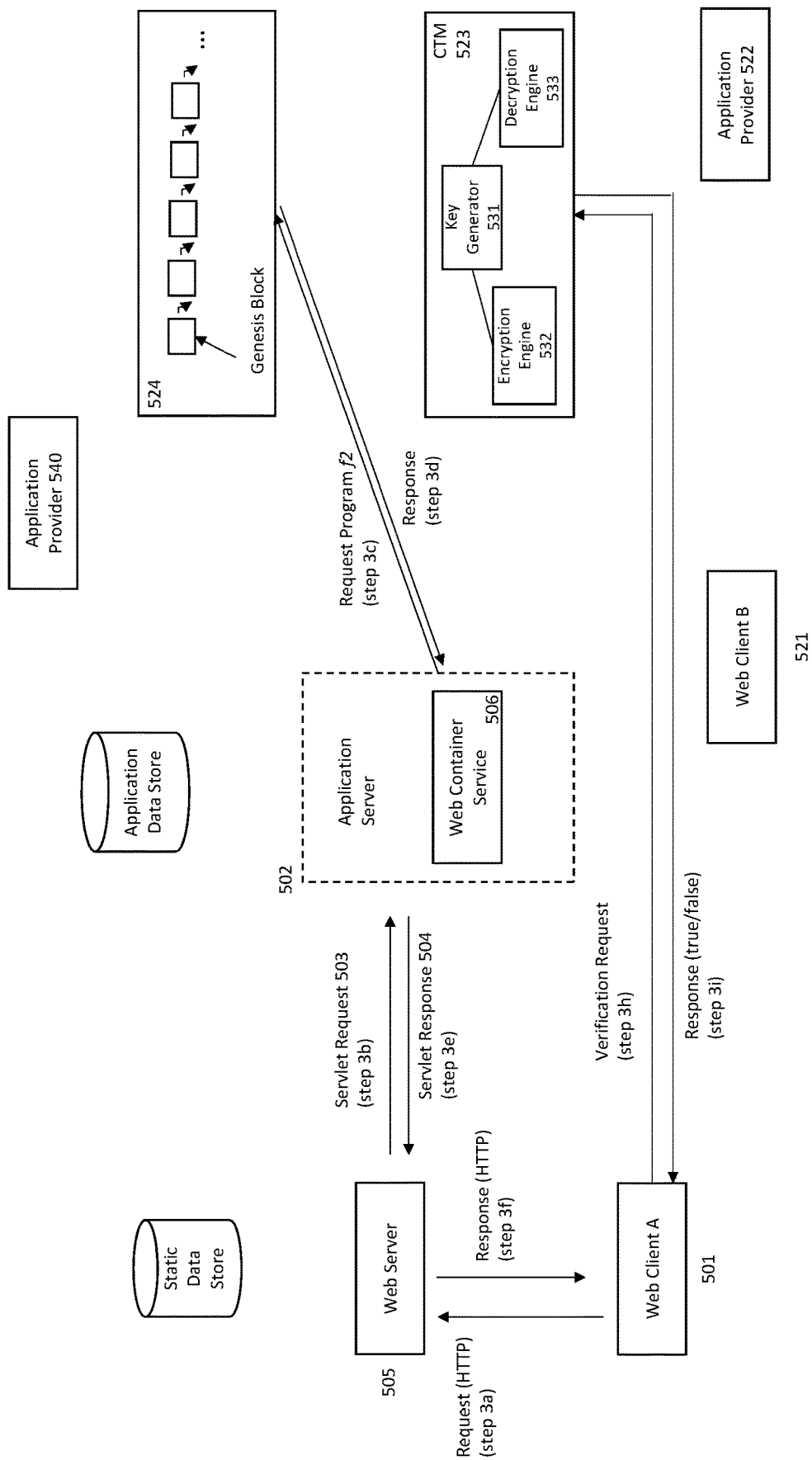
Fig. 5C (Viewing Shared Content)

SYSTEM AND METHOD ESTABLISHING A TRUST MODEL FOR SHARED CONTENT ON THE INTERNET

RELATED APPLICATIONS

This application claims priority to U.S. Provisional Application Ser. No. 62/621,487, filed Jan. 24, 2018. This application is related to co-pending U.S. application Ser. No. 16/006,966, filed Jul. 13, 2018; Ser. No. 16/036,012, filed Jul. 16, 2018 and Ser. No. 16/160,284, filed Apr. 2, 2018, which claim the benefit of U.S. Provisional Application Ser. No. 62/651,410, the contents of which are incorporated herein by reference.

BACKGROUND

The early days of the Internet and Web services used a static model of web content in which pre-determined content was served to users. In some cases, low and high bandwidth connections were used to serve two different versions of content, e.g., low bandwidth connections did not contain graphics.

In succeeding years, the concept of dynamically constructed web pages was introduced whereby content on a page was customized or personalized by a website on a per user basis, i.e., when the web page request was received. Typically, upon receiving a request, information about the requesting user, e.g., his social graph, determined the content that was then assembled and served to the user. The assembled content was typically sent to a browser running in the client device whereupon it was rendered by the browser's software.

The notion of collecting content that could then be assembled into a page, i.e., the dynamic page construction method, forms the basis for a new kind of content on the Internet, called user generated content (UGC). Some observers use the term "Web 2.0" to describe websites that collect and present UGC employing dynamic page construction technology. Many websites today store and provide different kinds of UGC, e.g., user postings on politics, personal views, blogs, reviews, ratings, etc. Many retail and e-commerce websites provide ratings and reviews for advertised products. Favorable reviews and ratings may make a big commercial impact. Many users today use UGC in making many personal and business decisions.

However, many consumers find UGC to be untrustworthy and not credible.

SUMMARY

In accordance with one aspect of the subject matter disclosed herein, a method is provided for validating an assertion provided by a web resource. The method includes: sending a first request to the web resource over a communications network; responsive to the first request, receiving a web page from the web resource, the web page including at least one user-selectable representation of a cryptographic credential, the cryptographic credential including at least one assertion that is based on underlying data and at least one proof that allows verification that the assertion accurately reflects the underlying data without revealing the underlying data; receiving a selection of the user-selectable representation that causes a second request for verification of the proof to be sent over the communications network; and responsive to the second request, receiving a response indicating whether or not the representation accurately reflects the underlying data.

In one example, a response indicating that the assertion accurately reflects the underlying data includes an assurance of a provenance of logic used to generate the assertion. In another example the response indicates whether or not the representation accurately reflects the underlying data is received from an entity having access to the proof, the assertion and a verifying key that are used to verify the proof in accordance with a zero-knowledge protocol. In another example the proof and the verifying key are generated by an encryption engine that uses as input logic that is used to generate the assertion. In another example the verifying key and the proof are accessible from a blockchain system on which the verifying key and the proof are stored. In another example the underlying data includes biometric data such as biometric data of a user providing content included on the web page. In another example the underlying data includes a credential issued by a third party such as a government agency or private party. In another example the underlying data includes sensor data.

In accordance with another aspect of the subject matter disclosed herein, a method is provided for providing to a web resource content to be shared with users over a communications network. The method includes: receiving from the web resource logic encapsulated in a web container, the logic allowing users to post content to a web resource that is sharable with other users over the communications network; causing the logic to be executed; providing user input to the logic, the user input including the content to be posted and a cryptographic credential, the cryptographic credential including at least one assertion that is based on underlying data and at least one proof that allows verification that the assertion accurately reflects the underlying data without revealing the underlying data, wherein the content and the cryptographic credential are maintained in an internal state of the logic; and causing the logic, in the internal state, to be stored on a blockchain system is accessible to the web resource.

BRIEF DESCRIPTIONS OF THE DRAWINGS

FIGS. 5A, 5B and 5C show one example of an operating environment in which the techniques described herein may be employed.

DETAILED DESCRIPTION

Motivation

Today's Internet is in the business of opinions. Consumers share opinions, i.e., views, reviews, suggestions, recommendations, ratings, etc., using a variety of data platforms and delivery methods. Celebrities boast of audience sizes in the millions. The amount of shared information is staggeringly large. A disproportionate number of decisions made, and opinions formed by consumers in their daily lives today are based on shared content.

Whereas many websites allow content to be shared amongst consumers, very little attention has been paid to web server technology to boost the trust and credibility in shared content. Some websites have adopted ways to soothe the concern of consumers. For example, some websites verify the accounts or identities of subscribers who share content. Such measures are based on business decisions made by the websites and are not supported by the underlying web technology. In the words of a pundit, the Internet today suffers from a crisis of credibility.

In some aspects, the present invention extends the functionality of web servers by allowing them to implement a trust model which
(i) permits consumers to add content to the web pages served by the web server, (ii) allows consumers to verify shared content by interacting with shared content through computer programs provided by one or more third parties, and
(iii) ensures that the security of the web server and the client (browser) is not compromised by these additional functionalities.

The new functionalities are achieved in part by integrating virtual machine technology with blockchain and cryptographic technologies.

Figure 1:
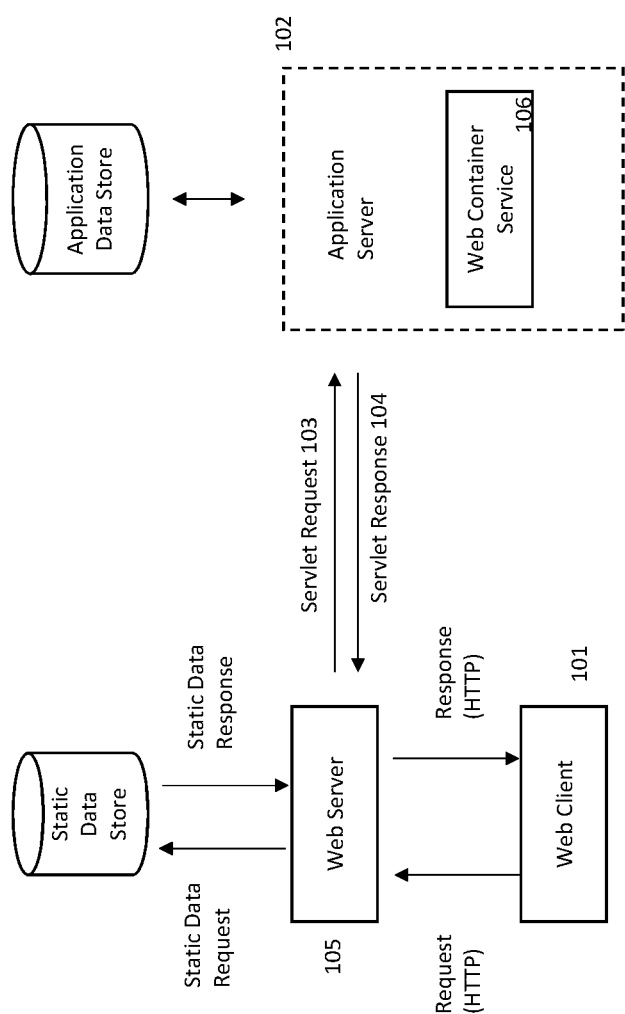
FIG. 1 shows an exemplary illustration of a web container using a web container service.

A web server (105, cf. FIG. 1) is a computer program that typically receives (service) requests from clients (browsers) 101 and in response serves (web) pages, the latter being rendered as, e.g., text and images, by the browsers. Several browsers may be served concurrently by a web server. In the early days of the web, the content of web pages was mostly static. To support dynamic content, i.e., content that could be tailored to specific groups of users, the notion of a servlet was introduced. A servlet is an application program that provides additional functionality to a web server. It may thus be thought of as an adjunct to the web server. (It is inadvisable to add functionality to a web server directly since the web server is tailored and optimized to serve many requests concurrently. Specializations are preferred to be added through the use of adjunct/application servers.) For example, cookies and other parameters such as user location that manage user sessions may be handled by application servers working in concert with a web server. For example, a web server may request and receive a servlet from an application server that allows the former to serve web pages to browsers that may then render video content under user control. In this example, the servlet may run in the web server environment and a client program (media player) may run in the browser environment. (The media player may be provided, for example, as a browser plug-in.)

Security concerns typically prevent web servers from allowing general application programs to run in their environments. The concern is that arbitrary programs may provide opportunities to malicious parties to introduce malware. Therefore, many application servers encapsulate application programs in web containers, i.e., a custom programming environment. The idea being that a web container contains the application program in the manner of an environment, the application program being constrained in some of its actions, and the host web server being insulated from certain consequences of the execution of the application program. Once the application program terminates, the host web server deletes the application program from its memory. Thus, an application server 102 receives a servlet request 103 and provides the requested servlet in a web container 104. In this manner, an application server may be said to provide a web container service 106.

Web containers are most often implemented as virtual machines. Historically, virtual machines were combinations of hardware and software emulating a physical computer. More recent usage has concentrated on software-based virtual machines that provide a controlled programming environment for an application program. Thus, the virtual machine may isolate the application program from certain details of the host machine. The term process virtual machine is sometimes used for the latter type of virtual machine. A process virtual machine may run on multiple hosts as in a cluster of computers. In such cases, details of the multiple hosts may be abstracted so that the application programmer may concentrate on the algorithmic aspects of the application. Most web containers are implemented as customized process virtual machines.

In practice, virtual machines (equivalently, web containers) are configured to allow application programs to invoke pre-determined functionalities only; again, this is primarily due to security concerns. For example, the afore-mentioned media player may not allow users to input their own videos or restrict users from fast-forwarding a video that is being rendered, etc.

Due to the security concerns mentioned above, the relationship between the web server and the application server is crucially important. Typically, most commercial establishments operate both components, i.e., the web and the application server. In some cases, two independent parties may operate the two components under a business arrangement.

Such operating agreements are important to consumers if they have to trust the information provided by the web server, i.e., the website (end users are often unaware that content is being provided by an application server via the web server). If a reviewer posts a fake review using the facilities provided by an application server, it is the website that gets the blame. If a single entity operates both the web and the application server than the blame is rightly placed. However, if different entities operate the two servers, we need an independent trust model that can assure the end users that proper precautions are being taken by the different operating entities.

Figure 2:
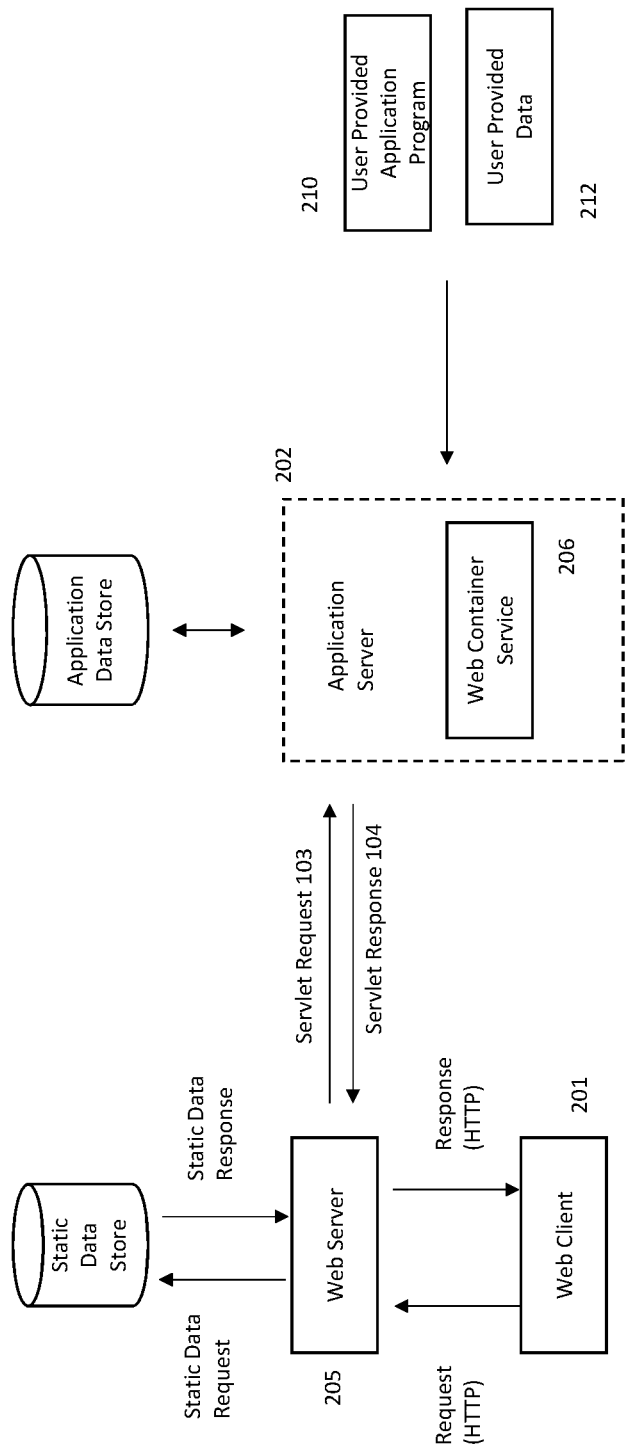
FIG. 2 shows an exemplary illustration by which applications and user data are provided to enhance the web container service.

Among other things, the present invention is concerned with allowing third parties to provide applications programs 210 (cf. FIG. 2) to the web container service 206 that may, additionally, operate on user provided input data 212 without compromising security and thereby increasing the services provided by the web container service. Thus, the application server becomes a more useful adjunct to the web server. Note that FIG. 2 is a duplicate of FIG. 1 to which entities 210 and 212 have been added.

Use of the present invention allows an independent trust model to be established between multiple operating entities, e.g., web server and application server, thereby enhancing the trust of consumers whilst providing additional functionalities to them.

Introduction to Blockchain Technology

Database technology is concerned with storing and manipulating, i.e., adding or making changes to, data. A transaction is a series of actions that make changes (as opposed to queries that retrieve) stored data. Transactions are typically managed by transaction processing systems that operate on data stored in databases. Blockchain technology may be described as a transaction processing system in which new data is always added to the stored data but previously stored data in never updated or modified. (Under special and rare circumstances, a transaction may record new data concerning a change to a previously recorded transaction, see, e.g., time lock transactions in cf. Mastering Bitcoin, Andrea Antonopoulos, O'Reilly, 2016.) For the purposes of the present invention, Blockchain technology will be considered to provide an immutable store of data in which transactional data is recorded.

The immutability property of blockchain technology is achieved by making use of a particular form of Merkle tree technology. A Merkle tree (cf. Method of providing digital signatures, Ralph Merkle, U.S. Pat. No. 4,309,569, is a data structure that hashes or encrypts data starting at the leaf level and working up to the root of the tree. One of its properties is that the values of any children nodes of a (sub)-tree rooted at, say node "r", cannot be changed without impacting the value of the node "r". Thus, the root node always ensures that none of its children nodes have been changed. As such the Merkle tree represents a data structure that may be used to implement an immutable store of data.

Blockchain technology may be considered as a transaction processing system in which the Merkle tree data structure may be used to record the transactional data. Typically, in blockchain systems, transactions are aggregated into blocks which are then added as nodes to a Merkle tree data structure.

Blockchain technology uses a particular form of Merkle trees, viz., a linked list of nodes, which may be described as a single path in a Merkle tree, i.e., each node has at most one child. The term ledger is used to describe this form of Merkle trees. Thus, the ledger is a linked list of nodes in which each node contains (hashed or encrypted) transactional data of all the previous nodes. Consonant with the term ledger, the term entries is used to describe the contents of, or data contained in the nodes. The starting or leaf node is the only childless node in the list. The root node has no parent node. If a new node has to be added to the list, it is added as the parent of the current root, i.e., it becomes the new root node.

Computer programs running on distinct computers are allowed to add new blocks to the ledger (also called updating the ledger or the blockchain). However, various randomization processes are used to ensure that a computer selected to update the ledger is not malicious. The term decentralized is used to denote arrangements by which computer programs are selected to update the ledger in a manner that no single entity can be said to be in control of the updates to the blockchain and any and all updates to the blockchain can be verified by tracing the blockchain, starting from the genesis block to the latest block.

This leads to a second property of blockchain systems of use in the present invention (in addition to the immutability property discussed above). Data is added to the blockchain by independently chosen computer programs in a decentralized fashion, i.e., there is no single authority dictating the selection of an updating entity or computer program. Furthermore, all update data is verified before it is added to the system and all data (from the moment of genesis) in the system may be verified by any third party by verifying the (public) ledger.

In summary, a blockchain system provides guarantees that the data stored in the system is immutable and is managed and verified by an independent collection of entities.

Figure 3:
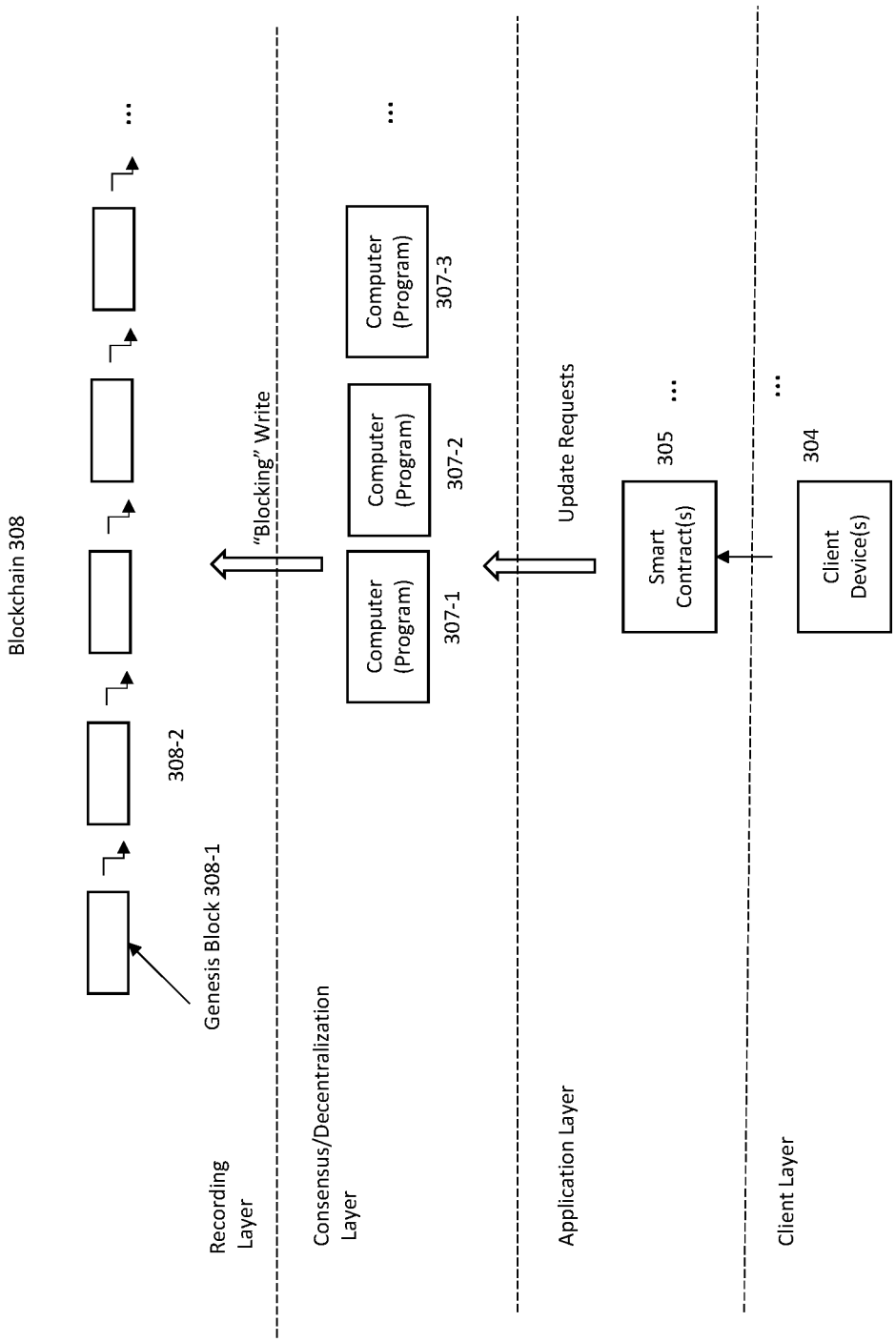
FIG. 3 shows an exemplary blockchain system.

FIG. 3 shows a simplified description of a blockchain system. 308 is a list of linked blocks with 308-1 as the genesis block. Client devices 304 initiate transactions by using computer programs called smart contracts. The latter request that the transactions be recorded in the blockchain, i.e., the blockchain needs to be updated. Typically, update requests are aggregated into a block and then recorded in the blockchain for efficiency reasons. (For example, the Bitcoin blockchain system uses a block size of about 2000 transaction requests.) Once a block of transactions is ready, a selection process ensues that selects one of the available computer programs 307-1, 307-2, etc. The selected computer (program) then adds the new block of transactions to the front of the blockchain 308. Importantly, every transaction in a block is verified before the block is added to the chain; unverified transactions are deleted from the block. Thus, the ledger is the sole arbiter of transactional validity.

Introduction to Cryptographic Techniques

We briefly summarize a few cryptographic techniques that enable aspects of the present invention.

An encryption scheme is a triple (G, E, D) where "G" is a computer program called the key generator (or key generating engine), "E" is a computer program called the encryption engine and "D" is a computer program called the decryption engine. For every (e, d) in the range of G and for every $\alpha \in (0,1)^*$, computer programs E (encryption) and D (decryption) satisfy Probability[D(d,E(e,$\alpha$))=$\alpha$]=1. In words, any bit string encrypted by the computer program E can be decrypted by the computer program D. The string E(e, $\alpha$) is the encryption of the plaintext $\alpha$ using the encryption e whereas D(d, $\beta$) is the decryption of the plaintext using the decryption key d. In a public key scheme, e≠d; in a private key scheme e=d. The elements of the pair (e, d) are called encryption and decryption keys, respectively. Further details can be found in O. Goldreich, *Foundations of Cryptography*, Vol. 2, Cambridge University Press, 2004.

Figure 4:
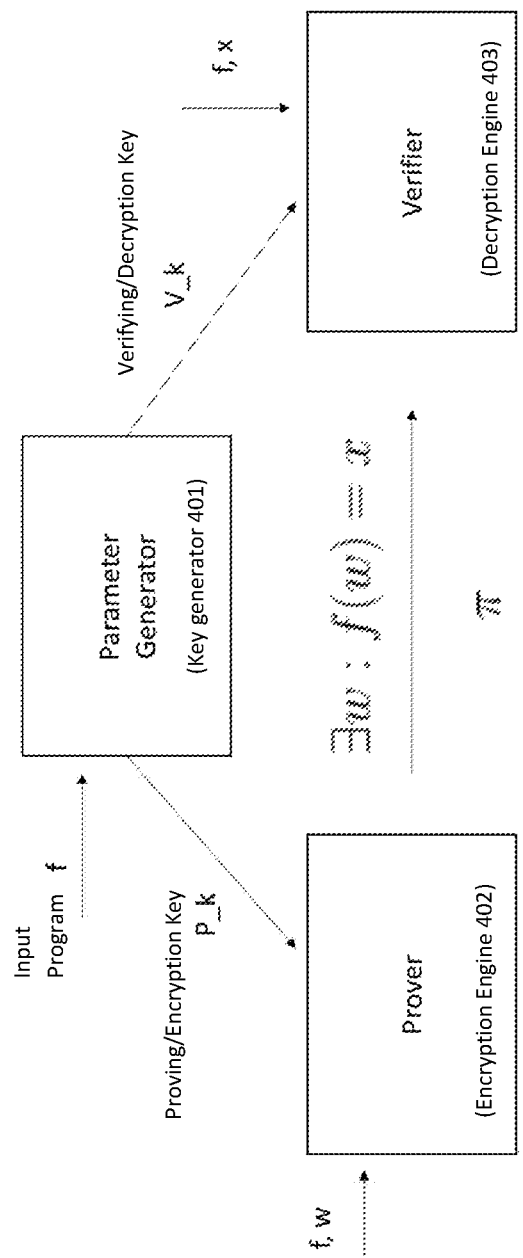
FIG. 4 illustrates the zero-knowledge protocol.

In a (private key) variant of the above scheme called the proof of zero knowledge protocol (cf. D. Genkin et al., Privacy in Decentralized Cryptocurrencies, Comm. Of the ACM 61.6, 2018, pg. 78-88, which is hereby incorporated by reference in its entirety), the key generator 401 (cf. FIG. 4) is provided as input to the computer program f. The key generator produces an encryption key $P_k$ (also called the proving key) and a decryption key (also called the verifying key), $V_k$.

The encryption key is provided to the encryption engine and the decryption key is provided to the decryption engine.

The encryption engine may be described as a computer program that takes as input a program, say f, an encryption key, $P_k$, and the input w to the computer program f. It runs the program f on input w and produces a pair (x, $\pi$) as its output where x is the (plaintext) output of the program f and $\pi$ is a (cryptographic) proof of the execution of the program f.

The decryption engine using the decryption key, $V_k$ verifies the proof $\pi$ of the assertion $\exists w f(w)=x$. (The engine reports "true" if verification succeeds; else it returns "false".) The soundness of the scheme asserts that the Probability[$\nexists$ w:f(w)=x] is negligible. The zero-knowledge assertion is that the decryption process does not yield any information, at least none that could not be inferred by other non-cryptographic means. (Trivially, output x is asserted in the clear.)

In embodiments, the decryption key may be provided to a blockchain system for storage. In such a case, the decryption engine may retrieve the stored decryption key as needed to verify a proof presented to it.

As an example of the above scheme, consider f to be the simple program that takes a user's date of birth as input w and computes if the user's age is greater than 21 by subtracting the current date from the input date of birth and verifying the result to be greater than 21 years. Those of ordinary skill in the art are well versed in writing programs of this type.

We now run f through the key generator which produces an encryption and decryption key. We provide program f and the input date of birth, w, to the encryption engine which runs the program f which produces output plaintext x and a cryptographic proof, $\pi$, of the execution of the program, f. The user may now present (x, $\pi$) as the cryptographic credential asserting that his age is greater than 21 (without, in fact, revealing his date of birth, i.e., the secret, w) to any third party who may verify it by recourse to the blockchain and an accompanying decryption service. That is, the cryptographic credential (x, $\pi$) comprises of the assertion x (viz., that program f ran and produced the statement x) and that $\pi$ is the proof of that alleged execution of f.

It is also important to observe that since the encryption engine encrypts the computer program f, the soundness property guarantees that the program f was unchanged, or else the proof $\pi$ could not have been verified. We refer to this as the provenance of the program f being guaranteed by the soundness property of the cryptographic scheme.

It is important to understand what is entailed by verifying a proof $\pi$. A person who verifies a proof $\pi$ does not know w (which is a secret held by the user) but believes that a program f executed on the unknown input producing the assertion x as output and that $\pi$ is a proof of the alleged execution of f. That is, the believer cannot in good faith believe in the validity of w; for all he knows, the user may have lied about his date of birth, w, in the above example case. But he can believe, on mathematical grounds, the alleged execution of the program f if the proof $\pi$ can be verified. Thus, the trust model requests belief in the execution of the computer program f. To trust the input w to f as being valid, we must look to the program f as checking the validity of its input w. For example, if the program f were to be run on a credential or other input data provided by the Motor Vehicle Agency or other government agency, or if f checks the validity of w, e.g., by checking for identification data provided by the Motor Vehicle Agency, then the believer may find w more trustworthy.

Thus, the believer has varying degrees of trust based on the capabilities of programs such as f. Proof of execution of a program that checks for the validity of the underlying input data w (e.g., a credential such as a driver license issued by a government agency or issued by a third party) is more trustworthy than proofs of programs that accept unvalidated input data from users, all else being equal. This is completely realistic since people have many types of credentials in their normal lives, some of which may be acceptable and some not at different places and by different vendors.

The trust model thus depends upon the capabilities of the programs f or data provided as input to program f. The present invention envisions an eco-system of providers that will supply a variety of programs with varying capabilities and their usage will be dictated by their acceptance by users and vendors.

The fact that the provided programs can be stored on a blockchain that acts as an immutable store is important since users can be assured that the programs have not been changed or altered. The fact that the decryption keys used to verify the proofs of program executions are also stored on a blockchain means that any third party can access the keys and verify the corresponding proofs.

In summary, a cryptographic credential is a pair (x, $\pi$) resulting from the execution of a program, say f, on input data, say w, where x, is the output of the program, called the "assertion" (in the clear) and $\pi$ is a cryptographic proof of the execution of program f. That is, the assertion x is based on the underlying input data and the proof $\pi$ allows verification that the assertion x accurately reflects the underlying data without revealing the underlying data.

While we have only shown a simple example of a cryptographic credential (age >21, $\pi$) generated by program f, in practice, quite sophisticated cryptographic credentials may be generated by using more complex computer programs. For example, computer programs are available in the public domain that process biometric data (e.g., facial images and fingerprint data) obtained, for instance, by scanning technologies. Likewise, mobile phones and devices allow access to various kinds of sensor data, e.g., GPS location data, weather data, fitness and health data, biometric data, etc. All such data may and is being processed by computer programs. Any of this data may be used as the underlying input data w. Such computer programs generating assertions x from underlying input data w, when coupled with the cryptographic technologies discussed herein, may be used to produce corresponding cryptographic credentials. Note that the cryptographic credentials (x,$\pi$) as described herein do not reveal the input w, i.e., the personal data of the user is kept private. Thus, e.g., the fingerprint or facial image data input to computer programs to produce cryptographic credentials is kept private.

Apparatus & Method of the Invention

FIGS. 5A, 5B and 5C show a functional block diagram of one example of an operating environment in which the techniques described herein may be employed. This example illustrates various entities such as web clients, servers, application providers data stores and a blockchain system that may communicate with one another over one or more communication networks (not shown). In general, any type of communications network may be employed whether wired, wireless or any combination thereof. For example, the communications network may include wide area networks (WANs) such as the Internet or an intranet. As another example, the communication networks may include a cellular network (e.g., 3G, CDMA). In yet another example, the communications networks may be a content delivery system such as a broadcast television network, cable data network (e.g. an all-coaxial or a hybrid-fiber/coax (HFC) network), an xDSL (e.g., ADSL, ADLS2, ADSL2+, VDSL, and VDSL2) system, or a satellite television network. In yet other examples communications networks may be a combination of two or more different types of networks.

FIG. 5A shows the operating environment during a provisioning phase when a web client B 521 creates a cryptographic credential. FIG. 5B shows the operating environment when the web client B 521 posts content to web server 505 and includes the cryptographic credential created during the provisional phase. FIG. 5C shows the operating environment when web client A 510 views the content posted by web client B 521 and verifies the cryptographic credential included with the content.

It should be noted that the functionality of various network elements shown in FIGS. 5A-5C may be combined with one another. For example, in some implementations the web server, application server and/or the application providers may be combined with another.

Web client A 501 and web client B 521 represent user devices that are able to establish communication over one or more communication networks and interact with web servers using a client-based application such as a web browser or other suitable user interface. Illustrative examples of web clients include, without limitation, personal computers, wireless mobile devices, smartphones, tablets, PDAs, entertainment devices such as video game consoles and other consumer electronic devices.

Web Client B 521 wishes to share information with web client 501. Application provider 522 provides application programs such as the programs f discussed above that allow the production of cryptographic credentials (specifically, the portion of the cryptographic credential denoted as the assertion x). Application provider 540 provides programs that allow users to share content, e.g., programs that allow consumers to state their review of a restaurant, etc. A stated above, the overall objective is that consumers may attach their cryptographic credentials to user generated content in order to increase the trust in shared content. We denote by f2 one such application program that allows content to be shared, e.g., a program that allows consumers to post reviews of restaurants. We assume an ecosystem of application program providers of which 540 and 523 are shown in FIG. 5 as examples. We further assume that CTM 523 is provisioned with one or more computer programs, such as f and f2 above.

Cryptographic Technology Module (CTM) 523 is a collection of servers running computer programs implementing the key generator 531, the encryption engine 532 and the decryption engine 533 (details of which have been described above with respect to FIG. 4). In a provisioning process, a cryptographic credential generating computer program, f, provided by application provider 522 is input to the key generator 531 of CTM 523 (cf. FIG. 5) which provides an encryption key to the encryption engine 532 and a decryption key to decryption engine 533. The latter, in turn, stores the decryption key on the blockchain 524. Encryption engine 531 runs the program f that accepts input data from web client B 521 and produces cryptographic credential (x, π) that is provided to web client B 521.

In embodiments, the program f may be provisioned to web client B 521 and the encryption engine 532 may be installed in the web client B 521. We may then run the encryption engine with program f whence it may produce the requisite cryptographic credential (x, π). In some embodiments, the functionalities of the program f may be incorporated into program f2, and vice versa.

Method:
1. Provisioning steps (FIG. 5A)
   a. We assume that the cryptographic credential (x, π) and an application program f2 are to be used in a servlet response 504 to provide additional functionality to web client 501. Details of the use case are presented later.
   b. Web client B (521) provides age information to cryptographic technology module (CTM) 523.
   c. Application provider provisions CTM 523 with program f.
   d. CTM 523 processes user's age information using program f and provisions web client B 521 with a cryptographic credential, (x,π).
   e. CTM 523 stores the corresponding decryption key in blockchain 524.
   f. Application provider 540 provides application program f2 to blockchain 524. In embodiments, application provider 540 may provide application program f2 to CTM that may encrypt it and cause it to be stored in blockchain 524.
   g. At the conclusion of the provisioning steps above, blockchain 524 has the program f2 and the web client B 521 has the cryptographic credential (x,π). In embodiments, CTM 523 may provide a representation of the cryptographic credential to the web client B 521 and store the cryptographic credential in the blockchain 524, e.g., the representation allows access to the cryptographic credential. For instance, the representation may be an HTML object containing a hyperlink that provides access to the cryptographic credential.
2. Posting content to be shared (FIG. 5B)
   a. Web client B 521 requests web server 505 for a web page that allows shareable content to be posted. (For example, web client B 521 may click a link provided on a web page for this purpose. This would engender a HTTP request.)
   b. Web server 505 requests (503) for web container service 506.
   c. Web container service 506 requests program f2 from Blockchain 524.
   d. Blockchain 524 provides program f2 to web container service 506.
   e. The web container service encapsulates program f2 in a web container and responds (504) to the web server 505.
   f. Web server 505 returns a web page containing the web container with program f2 to web client B 521 as a response to request 550. (If the program f2 was stored in encrypted form—as described in certain embodiments above—the request from web container service 506 may include a decryption request; alternatively, 506 may be provisioned with decryption keys and it may perform the decryption of f2 itself)
   g. Web client B 521 causes program f2 on the received web page to be executed, e.g., by clicking a link provided for such a purpose on the displayed web page.
   h. Responding to the command issued in step "2g" above, program f2 requests consumer via web client B 521 to input his review and his cryptographic credential, (x,π).
   i. Program f2 integrates the inputted review material and the cryptographic credential, (x,π), into its internal state (memory) and stores the latter in blockchain 524.
   j. At the conclusion of step 2i, web client B 521 has posted his review on blockchain 524 (integrated into the internal state of program f2) and integrated his cryptographic credential into the internal state of program f2.
3. Viewing Shared Content (FIG. 5C)
   a. Web client A (501) requests service from web server 505; the latter determines to use web container service 506 provided by application server 502.
   b. Web server 505 issues web container (servlet) request to web container service 506.
   c. Web container service 506 requests program f2 (along with the internal state of f2) from blockchain 524.
   d. Blockchain 524 responds with program f2 along with its internal state. Note that the internal state of f2 may contain, in embodiments, a representation of the cryptographic credential and/or of the posted review. Alternatively, it may contain the review and the cryptographic credential object.
   e. Web container service 506 sends web container (servlet) response (containing program f2 and its internal state) to web server 505.
   f. Web server 505 creates a web page which contains the web container received in step "e" above and sends it to web client A 501.
   g. Web client A 501 may now render the received web page which contains the program f2 and a representation of the internal state of program f2. Note that program f2 may decide, in embodiments, how to render its internal state. For example, it may render the data of the posted review as ascii text and the cryptographic credential data as a clickable Hyper Text Markup Language (HTML) object. Consumer wishing to verify displayed cryptographic credential data issues verification request, e.g., by clicking the representation of the cryptographic credential.

h. Program f2 receives consumer verification command and sends it to the decryption engine 533.

i. Decryption Engine 533 verifies received request using the previously provisioned decryption key. The result of the verification is true/false accordingly. (Note that, in embodiments as described above, if the decryption key and/or the cryptographic credential are stored on blockchain 524, the decryption engine 533 may retrieve the decryption key and/or the cryptographic credential from blockchain 524.) Decryption engine 533 sends response (either true or false, accordingly) to program f2 running in web client A 501.

4. Thus, web client A 501 receives a web page containing an application program f2 provided by application provider 540. Program f2 displays/renders the data of its internal state. Such renderings may contain the review and a representation of a cryptographic credential, (x,π), provided by the web client B (521). Web client A 501 may request and receive verification of the representations of cryptographic credential(s) displayed on the received web page.

In embodiments, web clients (such as web client A 501, cf. FIG. 5A) may be provisioned with decryption engine 533. In such embodiments, the web client may thus perform the decryption service as a local computation, possibly accessing the stored decryption key and/or the cryptographic credential from blockchain 524 as needed.

Discussion

Consider a restaurant's website that wishes to display reviews posted by its customers. As has been reported in the press, many consumers do not trust posted reviews. To increase the trust in their reviews, the web site may request reviewers to include personal information such as employment information (e.g., reviewer works as a food critic for a newspaper), information demonstrating that reviewer lives in the neighborhood of the restaurant, etc. Reviews that include such information would engender more trust amongst the user community. A problem with this approach is that reviewers may be leery of sharing personal details out of concern for their privacy.

It seems appropriate to use the technology of cryptographic credentials as described herein. A cryptographic credential would allow the viewer to verify the employment, address, age, location, etc., of a reviewer. Concomitantly, the cryptographic credential would be based on the reviewer's information that is kept secret by the technology described above.

Thus, viewers of shared content are provided assurances that the shared content is trustworthy, and the privacy concerns of reviewers are addressed.

The restaurant's website acquires additional capabilities by the use of an application server using services provided by third party service providers. The enhanced services do not impose additional security risks; rather they enable the user community to repose more trust in a decentralized collection of operating entities. Furthermore, it provides the website with the flexibility of entering into business relationships with an eco-system of service providers under a decentralized system of trust based on cryptographic technologies.

In this regard, we note that previous technology in the area of user identity and authentication can be categorized into three classes.

1. A website may allow a user to create an identity, e.g., username and password. The user may then the username and password to gain access next time. Thus, the website stores the user data locally.

2. A company may allow users to utilize user data used to gain access at a first website to gain access to a second website. For example, Facebook allows users to use a Google username and password information to gain access to their Facebook accounts.

3. An identity provider may create tokens based on user provided information and store them on a blockchain. By this action, the identity provider, in essence, states that any third party may access the token on the blockchain and be assured that they are untampered. However, the third party still needs to trust the identity provider that the tokens are valid.

In contrast, using the techniques described herein, trust is placed on the execution of a computer program that resulted in the creation of a cryptographic credential. Simply put, the trust is placed on verifiable executions of computer programs whereas in the conventional examples cited above, trust is placed in commercial or government entities.

Illustrative Computing Environment

As discussed above, aspects of the subject matter described herein may be described in the general context of computer-executable instructions, such as program modules, being executed by a computer. Generally, program modules include routines, programs, objects, components, logic, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein the terms "software," "computer programs," "programs," "computer code" and the like refer to a set of program instructions running on an arithmetical processing device such as a microprocessor or DSP chip, or as a set of logic operations implemented in circuitry such as a field-programmable gate array (FPGA) or in a semicustom or custom VLSI integrated circuit. That is, all such references to "software," "computer programs," "programs," "computer code," as well as references to various "engines" and the like may be implemented in any form of logic embodied in hardware, a combination of hardware and software, software, or software in execution. Furthermore, logic embodied, for instance, exclusively in hardware may also be arranged in some embodiments to function as its own trusted execution environment.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

The invention claimed is:

1. A method for validating an assertion provided by a web resource, comprising:
   sending a first request to the web resource over a communications network;
   responsive to the first request, receiving a web page from the web resource, the web page including at least one user-selectable representation of a cryptographic credential, the cryptographic credential including at least one assertion that is based on underlying data and at least one proof that allows verification that the assertion accurately reflects the underlying data without revealing the underlying data;
   receiving a selection of the user-selectable representation that causes a second request for verification of the proof to be sent over the communications network; and
   responsive to the second request, receiving a response indicating whether or not the representation accurately reflects the underlying data, wherein the response indicating whether or not the representation accurately reflects the underlying data is received from an entity having access to the proof, the assertion and a verifying key that are used to verify the proof in accordance with a zero-knowledge protocol.

2. The method of claim 1, wherein a response indicating that the assertion accurately reflects the underlying data includes an assurance of a provenance of logic used to generate the assertion.

3. The method of claim 1, wherein the proof and the verifying key are generated by an encryption engine that uses as input logic that is used to generate the assertion.

4. The method of claim 1, wherein the verifying key and the proof are accessible from a blockchain system on which the verifying key and the proof are stored.

5. The method of claim 1, wherein the underlying data includes biometric data.

6. The method of claim 5, wherein biometric data is biometric data of a user providing content included on the web page.

7. The method of claim 1, wherein the underlying data includes a credential issued by a third party.

8. The method of claim 7, wherein the third party is a government agency.

9. The method of claim 1, wherein the underlying data includes sensor data.

10. A method for providing to a web resource content to be shared with users over a communications network, comprising:
    receiving from the web resource logic encapsulated in a web container, the logic allowing users to post content to a web resource that is sharable with other users over the communications network;
    causing the logic to be executed;
    providing user input to the logic, the user input including the content to be posted and a cryptographic credential, the cryptographic credential including at least one assertion that is based on underlying data and at least one proof that allows verification that the assertion accurately reflects the underlying data without revealing the underlying data, wherein the content and the cryptographic credential are maintained in an internal state of the logic;
    causing the logic, in the internal state, to be stored on a blockchain system is accessible to the web resource; and
    providing the underlying data to an entity that generates the cryptographic credential in accordance with a zero-knowledge protocol;
    receiving the cryptographic credential from the entity.

11. The method of claim 10, wherein the logic is received by, and caused to be executed by, a web browser of a web client.

12. The method of claim 11, wherein the underlying data includes sensor data obtained from a sensor associated with the web client.

13. The method of claim 11, wherein the underlying data includes biometric data.

14. The method of claim 13, wherein biometric data is biometric data of a user providing the content to be posted to the web resource.

* * * * *